United States Patent
Xu et al.

(10) Patent No.: US 11,050,533 B2
(45) Date of Patent: Jun. 29, 2021

(54) WIRELESS COMMUNICATION METHOD AND WIRELESS COMMUNICATION DEVICE FOR GENERATING A PILOT PATTERN AND PERFORMING CHANNEL ESTIMATION

(71) Applicant: Sony Corporation, Tokyo (JP)

(72) Inventors: Pingping Xu, Nanjing-Jiangsu (CN); Lin Xiao, Nanjing-Jiangsu (CN); Ying Liu, Nanjing-Jiangsu (CN); Penshun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 140 days.

(21) Appl. No.: 16/318,908

(22) PCT Filed: Jun. 23, 2017

(86) PCT No.: PCT/CN2017/089723
§ 371 (c)(1),
(2) Date: Jan. 18, 2019

(87) PCT Pub. No.: WO2018/014700
PCT Pub. Date: Jan. 25, 2018

(65) Prior Publication Data
US 2019/0190671 A1 Jun. 20, 2019

(30) Foreign Application Priority Data

Jul. 21, 2016 (CN) .......................... 201610579944.8

(51) Int. Cl.
*H04L 5/00* (2006.01)
*H04L 25/02* (2006.01)
(Continued)

(52) U.S. Cl.
CPC ............ *H04L 5/0048* (2013.01); *H04L 25/02* (2013.01); *H04L 25/08* (2013.01); *H04L 27/264* (2013.01);
(Continued)

(58) Field of Classification Search
CPC ....... H04L 5/0048; H04L 25/02; H04L 25/08; H04L 27/2613; H04L 27/264; H04L 27/296
See application file for complete search history.

(56) References Cited

U.S. PATENT DOCUMENTS

| 2012/0243625 | A1 | 9/2012 | Berg |
| 2017/0099172 | A1* | 4/2017 | Ren ..................... H04L 25/0202 |
| 2017/0230202 | A1* | 8/2017 | He ..................... H04L 27/2649 |

FOREIGN PATENT DOCUMENTS

| CN | 103368889 A | 10/2013 |
| CN | 103888406 A | 6/2014 |
| CN | 104283660 A | 1/2015 |

OTHER PUBLICATIONS

He et al., "A pilot-aided channel estimation method for FBMC/OQAM communications system", International Symposium on Communications and Information Technologies, 2012, 7 Pages total.

(Continued)

*Primary Examiner* — Ricky Q Ngo
*Assistant Examiner* — Stephen N Steiner
(74) *Attorney, Agent, or Firm* — Xsensus LLP (57) ABSTRACT

A method includes for a designated pilot symbol of at least one pilot symbol to be inserted into a data sequence, determining a first subcarrier and a second subcarrier adjacent to a position of the designated pilot symbol in a frequency domain; at least separately determining a first position and a second position on the first subcarrier and the second subcarrier; determining a first symbol and a second
(Continued)

symbol, so that the first symbol is capable of neutralizing interference on the designated pilot symbol of data symbols in positions other than the first position within a predetermined range of the first subcarrier, and the second symbol is capable of neutralizing interference on the designated pilot symbol of data symbols in positions other than the second position within a predetermined range of the second subcarrier; and respectively inserting the first symbol and the second symbol in the first and second positions.

18 Claims, 5 Drawing Sheets

(51) Int. Cl.
  *H04L 27/26* (2006.01)
  *H04L 25/08* (2006.01)
(52) U.S. Cl.
  CPC ...... *H04L 27/2613* (2013.01); *H04L 27/2698* (2013.01)

(56) References Cited

OTHER PUBLICATIONS

Bazzi et al., "Power Efficient Scattered Pilot Channel Estimation for FBMC/OQAM", 10th International ITG Conference on Systems, Communications and Coding, Feb. 5, 2015, 8 Pages total.
International Search Report dated Aug. 23, 2017 for PCT/CN2017/089723 filed on Jun. 23, 2017, 10 pages including English translation.

\* cited by examiner

WIRELESS COMMUNICATION METHOD AND WIRELESS COMMUNICATION DEVICE FOR GENERATING A PILOT PATTERN AND PERFORMING CHANNEL ESTIMATION

CROSS-REFERENCE TO RELATED APPLICATIONS

The present application is based on PCT filing PCT/CN2017/089723 filed 23 Jun. 2017, and claims priority to 201610579944.8, filed in the Chinese Patent Office on 21 Jul. 2016, the entire contents of each of which being incorporated herein by reference.

FIELD

The present disclosure relates to a wireless communication method and a wireless communication device, and in particular to a method and a device for generating a pilot pattern and performing channel estimation using the pilot, wherein the pilot pattern is applicable to a filter bank-based multi-carrier (FBMC) system.

BACKGROUND

At present, the orthogonal frequency division multiplexing (OFDM) technology has been widely applied in various wireless communication systems, which has obvious advantages in spectrum efficiency, anti-multipath fading, and implementation complexity. The OFDM technology also has disadvantages. For example, a cyclic prefix is required to cope with multipath fading, high peak-to-average power ratio, etc. In addition, since the fifth generation (5G) mobile communication system is required to support high data transmission rate, a large bandwidth is required.

Figure 1:
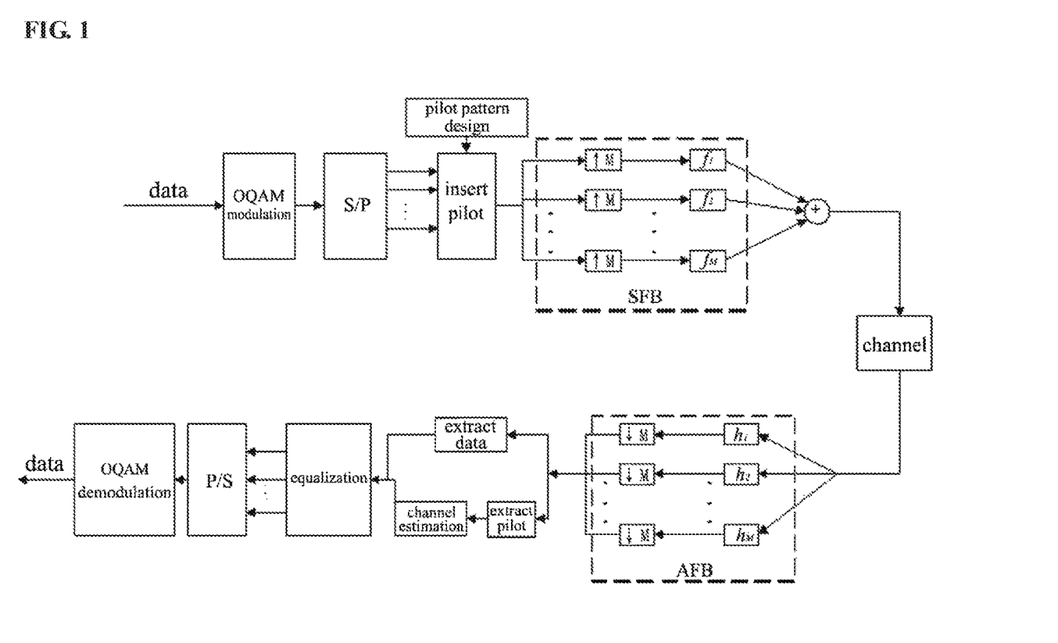
FIG. 1 is a block diagram of an FBMC/OQAM system.

In order to solve the problems, the filter bank-based multi-carrier (FBMC) technology has drawn much attention. FIG. 1 shows architecture of an FBMC/OQAM system in which channel estimation is performed using pilot. As shown in FIG. 1, at the transmitting side, the OQAM modulation is performed on the data, and the modulated data is converted into multiple paths through serial-parallel (S/P) conversion. Then a designed pilot pattern is inserted into the data, and the data in the multiple paths with the pilot inserted therein is filtered by a synthesis filter bank (SFB) and then is transmitted via an antenna. In the SFB, M represents the number of sub-carriers, and f represents filter functions respectively corresponding to different sub-carriers. The SFB is used to perform shaping filtering on each of the sub-carriers to be transmitted.

After the data is transmitted via a channel, the signal received via an antenna is firstly filtered by an analysis filter bank (AFB) at the receiving side. In the AFB, M represents the number of sub-carriers, and h represents filter functions respectively corresponding to different sub-carriers. The AFB is generally designed in correspondence with the SFB at the transmitting side, and is configured to perform matched filtering. Then, data and pilot are extracted from the filtered signal, and the channel estimation is performed using the extracted pilot. Channel equalization is performed based on the result of the channel estimation. Next, parallel-to-serial (P/S) conversion and OQAM demodulation are performed on the data, and finally the transmitted data is recovered.

Figure 2:
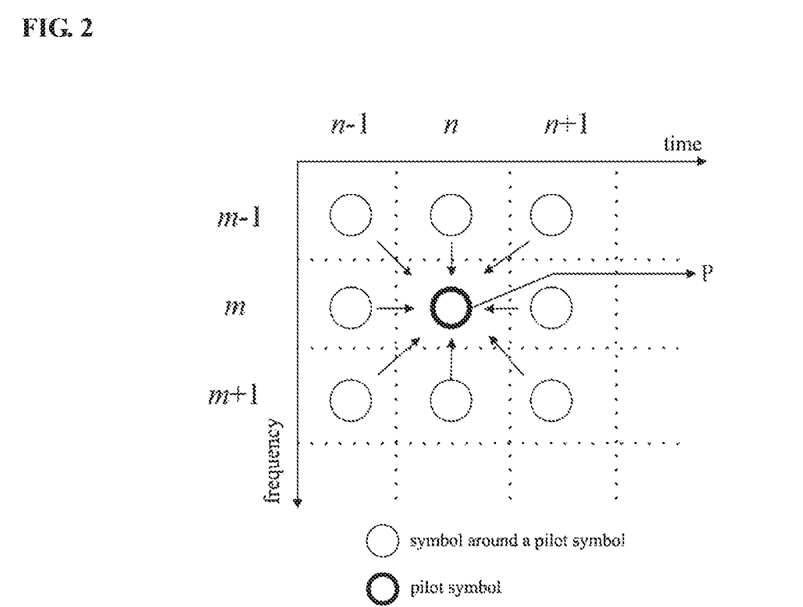
FIG. 2 schematically shows interference to a pilot symbol caused by symbols around the pilot symbol.

In the FBMC/OQAM system shown in FIG. 1, the receiving side performs the channel estimation based on the pilot extracted from the received signal. Since the FBMC system does not require orthogonality in complex number domain as the OFDM system requires, but merely requires orthogonality of the filter bank in real number domain, the receiving side of the FBMC system cannot completely separate the non-orthogonal part (imaginary number part). Imaginary number interference exists among the sub-carriers, and thereby forming inherent interference of the FBMC system. In this case, after the signal is transmitted via the multipath channel, the pilot symbol inserted by the transmitting side is subjected to the interference caused by symbols around the pilot symbol, as shown in FIG. 2. In FIG. 2, the pilot symbol is indicated by symbol P, a horizontal axis represents time, and a vertical axis represents frequency. Three symbols n−1, n, n+1 in time domain and three sub-carriers m−1, m m+1 in frequency domain are schematically shown in FIG. 2. As shown in FIG. 2, multiple symbols around the pilot symbol P cause interferences to the pilot symbol P (as indicated by arrows).

Due to the interference to the pilot symbol, the channel estimation performance in the FBMC system is severely affected, which directly affects the demodulation performance of the receiving side. Therefore, the pilot-based channel estimation method of the OFDM system cannot be directly applied to the FBMC system due to the existence of the inherent interference in the system. In this case, the method for dealing with the inherent interference is particularly important for increasing accuracy of the channel estimation.

Some solutions have been proposed with respect to this problem. For example, a channel estimation method using sequence pilot has been proposed, in which a column of zero symbols are arranged on each of two sides of a pilot sequence to protect the pilots from interference caused by other symbols. Since the interference to the pilot is mainly caused by the symbols (i.e., symbols shown in FIG. 2) in the first-order neighborhood of the pilot, a good channel performance can be achieved with this scheme. However, since a large number of zero symbols are used in this scheme, the spectrum efficiency is reduced. Further, in this scheme a pilot sequence is arranged only at the forefront of a frame structure, and the channel state for the whole frame structure is estimated using the pilot sequence. Therefore, this scheme is not applicable to a fast fading channel.

SUMMARY

A novel pilot design scheme is provided in the present disclosure to solve the above problems, which can cancel interference to the pilot symbol to the maximum extent, thereby improving channel estimation performance in the FBMC system.

According to an aspect of the present disclosure, an electronic device for a filter bank multi-carrier system is provided. The electronic device includes a processing circuitry. The processing circuitry is configured to: determine, for a specific pilot symbol of at least one pilot symbol to be inserted into a data sequence, a first sub-carrier and a second sub-carrier adjacent to a position of the specific pilot symbol in frequency domain; determine at least a first position and a second position on the first sub-carrier and the second sub-carrier, respectively; and determine a first symbol to be inserted into the first position and a second symbol to be inserted into the second position, such that the first symbol can cancel interference to the specific pilot symbol caused by data symbols at other positions than the first position within a predetermined range on the first sub-carrier, and such that the second symbol can cancel interference to the specific pilot symbol caused by data symbols at other positions than the second position within a predetermined range on the second sub-carrier.

According to another aspect of the present disclosure, a method for setting pilot in a filter bank multi-carrier system is provided. The method includes: determining, for a specific pilot symbol of at least one pilot symbol to be inserted into a data sequence, a first sub-carrier and a second sub-carrier adjacent to a position of the specific pilot symbol in frequency domain; determining at least a first position and a second position on the first sub-carrier and the second sub-carrier, respectively; determining a first symbol and a second symbol, such that the first symbol can cancel interference to the specific pilot symbol caused by data symbols at other positions than the first position within a predetermined range on the first sub-carrier, and such that the second symbol can cancel interference to the specific pilot symbol caused by data symbols at other positions than the second position within a predetermined range on the second sub-carrier; and inserting the first symbol and the second symbol into the first position and the second position, respectively.

According to another aspect of the present disclosure, an information processing apparatus in a filter bank multi-carrier system is provided. The information processing apparatus includes: the electronic device described above; a pilot inserting device configured to insert a pilot pattern consisting of the specific pilot symbol, the first symbol and the second symbol into the data sequence; and one or more antennas configured to transmit the data sequence in which the pilot pattern is inserted.

According to another aspect of the present disclosure, an information processing apparatus in a filter bank multi-carrier system is provided. The information processing apparatus includes: one or more antennas configured to receive a data sequence in which a pilot pattern is inserted, where the pilot pattern contains a pilot symbol; a pilot extracting device configured to extract the pilot symbol from the received data sequence; and a channel estimating device configured to perform channel estimation using the extracted pilot symbol. In the pilot pattern, a first symbol and a second symbol are respectively arranged on a first sub-carrier and a second sub-carrier adjacent to a position of the pilot symbol in frequency domain. The first symbol is used for canceling interference to the pilot symbol caused by data symbols other than the first symbol within a predetermined range on the first sub-carrier, and the second symbol is used for canceling interference to the pilot symbol caused by data symbols other than the second symbol within a predetermined range on the second sub-carrier.

BRIEF DESCRIPTION OF THE DRAWINGS

The present disclosure may be better understood with reference to the following description given in conjunction with the drawings, in which same or similar reference signs are used to denote the same or similar components throughout the drawings. The drawings together with the following detailed description are included in this specification and form a part of this specification, and are used to further illustrate preferred embodiments of the present disclosure and explain principles and advantages of the present disclosure. In the drawings.

DETAILED DESCRIPTION OF EMBODIMENTS

FIG. 2 shows interference to a pilot symbol P caused by multiple symbols around the pilot symbol. The interference may include inter-symbol interference in time domain and inter-carrier interference in frequency domain. The two types of interferences are respectively processed in the present disclosure, which are described below in detail.

The inter-symbol interference to the pilot symbol P is mainly caused by the adjacent symbols on the right and left of the pilot symbol in time domain, for example, two adjacent symbols on the right and left of the pilot symbol P which are on the same sub-carrier m as the pilot symbol P. The inter-symbol interference to the pilot symbol P caused by other symbols on the sub-carrier m is usually negligible. In this case, a simple zero-forcing method may be adopted to cancel the inter-symbol interference. The inter-symbol interference can be substantially cancelled by zeroing the symbols on the left and right sides of the pilot symbol P (that is, by arranging zero symbols).

The inter-carrier interference is caused by symbols within a large range. There are usually multiple symbols causing interference to the pilot symbol P on a sub-carrier (e.g., sub-carrier m−1, sub-carrier m+1) adjacent to the pilot symbol P in frequency domain. That is, multiple symbols within a certain range on the adjacent sub-carrier may cause the inter-carrier interference to the pilot symbol P. As such, the interferences cannot be fully cancelled by a simple zero-forcing method, and even when the zero-forcing method is employed, spectrum efficiency is decreased due to excessive use of zero symbols. Therefore, in the present disclosure, for the inter-carrier interference, multiple (for example, two) non-zero symbols may be arranged on the adjacent sub-carriers of the pilot symbol P to cancel the interference to the pilot symbol P caused by other symbols on the adjacent sub-carriers.

Figure 3:
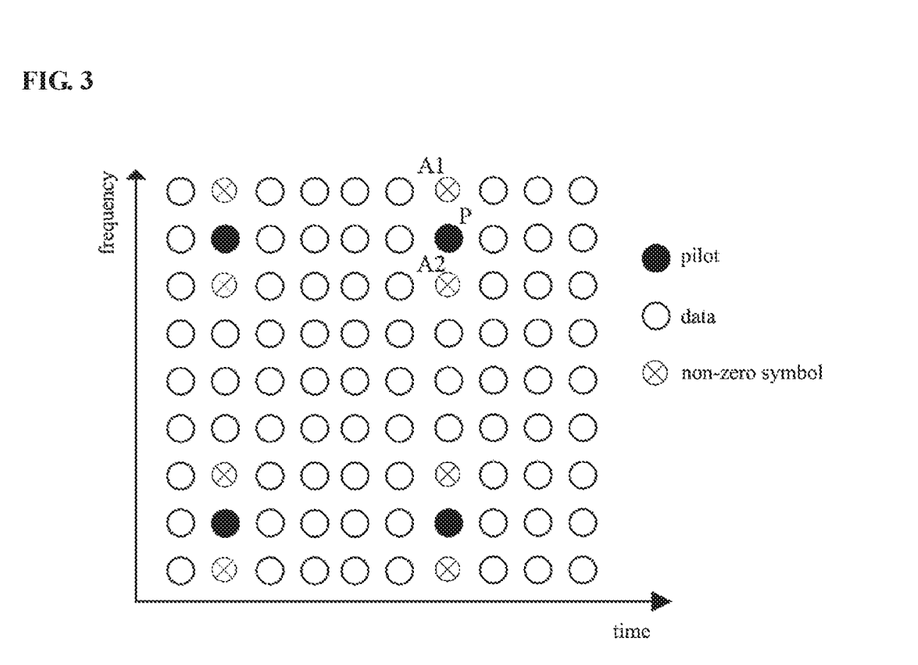
FIG. 3 schematically shows design for a pilot pattern according to an embodiment of the present disclosure.

FIG. 3 shows an example of a pilot pattern designed in accordance to the above principle. The example is merely used to cancel the inter-carrier interference, and may be a basis for various modified embodiments to be described below. In FIG. 3, four pilot symbols (represented by black dots in FIG. 3) are inserted into data symbols. Taking a pilot symbol at the upper right as an example, non-zero symbols A1 and A2 are respectively arranged on two sub-carriers adjacent to the pilot symbol P in frequency domain. Values of the non-zero symbols A1 and A2 are designed to cancel the interference to the pilot symbol P caused by other symbols on the corresponding sub-carrier than the non-zero symbol. A method for calculating the values of the non-zero symbols A1 and A2 is described below with reference to Table 1.

As described above, the inserted pilot symbol is subjected to the interferences caused by symbols around the pilot symbol. The symbols at different positions around the pilot symbol cause different degrees of interference to the pilot symbol, which may be indicated by interference weights. Table 1 schematically shows distribution of interference weights of an FBMC system. A time axis shown in FIG. 3 corresponds to rows in Table 1, and a frequency axis shown in FIG. 3 corresponds to columns in Table 1. A pilot symbol is located at a position of $(m_p, n_p)$. For example, interference weights corresponding to two symbol positions directly adjacent to the pilot symbol in time domain are respectively indicated by $t_{m_p,n_p-1}$ and $t_{m_p,n_p+1}$, and interference weights corresponding to two symbol positions directly adjacent to the pilot symbol in frequency domain are respectively indicated by $t_{m_p-1,n_p}$ and $t_{m_p+1,n_p}$. Similarly, interference weights corresponding to other positions may be determined.

TABLE 1

| sub-carrier | symbol | | | | |
| --- | --- | --- | --- | --- | --- |
| | $n_p - 2$ | $n_p - 1$ | $n_p$ | $n_p + 1$ | $n_p + 2$ |
| $m_p - 1$ | $tm_p - 1, n_p - 2$ | $tm_p - 1, n_p - 1$ | $tm_p - 1, n_p$ | $tm_p - 1, n_p + 1$ | $tm_p - 1, n_p + 2$ |
| $m_p$ | $tm_p, n_p - 2$ | $tm_p, n_p - 1$ | 1 | $tm_p, n_p + 1$ | $tm_p, n_p + 2$ |
| $m_p + 1$ | $tm_p + 1, n_p - 2$ | $tm_p + 1, n_p - 1$ | $tm_p + 1, n_p$ | $tm_p + 1, n_p + 1$ | $tm_p + 1, n_p + 2$ |

The interference weights corresponding to different positions are different. A symbol at a position corresponding to a large interference weight causes a large interference to the pilot symbol, and a symbol at a position corresponding to a small interference weight causes a small interference to the pilot symbol.

The values of the non-zero symbols A1 and A2 shown in FIG. 3 are calculated based on the interference weights in Table 1. It is assumed that the non-zero symbol A1 in FIG. 3 is located at a position of $(m_p-1, n_p)$ in Table 1. Since the non-zero symbol A1 is designed to cancel interference to the pilot symbol caused by multiple symbols on the $(m_p-1)$-th sub-carrier, the value $a_{m_p-1,n_p}$ of the non-zero symbol A1 may be calculated from the following equation (1):

$$a_{m_p-1,n_p} = \frac{-\sum_{\substack{n=1 \\ n \neq n_p}}^{N} (a_{m_p-1,n}) \cdot (t_{m_p-1,n})}{t_{m_p-1,n_p}} \quad (1)$$

wherein $a_{m_p-1,n}$ represents a value of the n-th symbol on the $(m_p-1)$-th sub-carrier (wherein the n-th symbol is not the non-zero symbol A1), and $t_{m_p-1,n}$ represents an interference weight corresponding to the n-th symbol.

If the equation (1) is slightly modified, that is, the value $a_{m_p-1,n_p}$ of the non-zero symbol A1 on the left side of the equation is multiplied by a denominator (that is, the interference weight $t_{m_p-1,n_p}$ corresponding to the non-zero symbol A1) on the right side of the equation, then an interference value of the non-zero symbol A1 to the pilot symbol can be obtained, which is equal to an opposite number of a sum of interferences to the pilot symbol caused by K1 other symbols on the $(m_p-1)$-th sub-carrier than the non-zero symbol A1. Therefore, influence of the non-zero symbol A1 on the pilot symbol may cancel the interferences to the pilot symbol by the K1 other symbols on the $(m_p-1)$-th sub-carrier, and thus the inter-carrier interference from the $(m_p-1)$-th sub-carrier can be cancelled.

Similarly, the value of the non-zero symbol A2 in FIG. 3 may be calculated from the following equation (2):

$$a_{m_p+1,n_p} = \frac{-\sum_{\substack{n=1 \\ n \neq n_p}}^{M} (a_{m_p+1,n}) \cdot (t_{m_p+1,n})}{t_{m_p+1,n_p}} \quad (2)$$

Similarly, influence of the non-zero symbol A2 on the pilot symbol may cancel the interferences to the pilot symbol by K2 other symbols on the $(m_p+1)$-th sub-carrier, and thus the inter-carrier interference from the $(m_p+1)$-th sub-carrier can be cancelled.

In the equations (1) and (2), n meets conditions of $0 < |n-n_p| \leq K_1$ and $0 < |n-n_p| \leq K_2$. It is easy to be understood that K1 and K2 each indicate that the interference of how many symbols on the corresponding sub-carrier is cancelled by the non-zero symbol A1 or A2. The K1 and K2 may be determined, for example, according to parameters of the filter bank and performance requirements (for example, a requirement for a bit error rate) of the system. For example, in a case that the system requires a high bit error rate (that is, the system requires high channel estimation performance), the K1 and K2 are large. That is, the value of the non-zero symbol A1 or A2 is required to cancel the interferences caused by a large number of adjacent symbols on the corresponding sub-carrier. Conversely, the range of the adjacent symbols of which the interference is to be cancelled may be narrowed. In particular, K1 and K2 are independently determined from each other, and thus they may have the same value or different values. In most cases, since the interference weights for the positions on the $(m_p-1)$-th sub-carrier and the $(m_p+1)$-th sub-carrier are symmetric, the K1 and K2 are set to be the same value.

It should be noted that FIG. 3 shows positions of the non-zero symbols A1 and A2 are in alignment with the position of the pilot symbol P in a vertical direction (i.e., in time domain), but it is not necessary. The arrangement of the non-zero symbols A1 and A2 on the corresponding sub-carriers is related to the interference weights of symbol positions. It is desired to arrange the non-zero symbols A1 and A2 at positions corresponding to large interference weights. In other words, interference weights corresponding to the positions of the non-zero symbols A1 and A2 should be respectively greater than interference weights corresponding to other positions on the corresponding sub-carriers, so as to reduce the values of the non-zero symbols A1 and A2.

As described above, a value obtained by multiplying the value of the non-zero symbol A1 or A2 by the corresponding interference weight is equal to an opposite number of the sum of the interferences caused by other multiple symbols. In a case that the sum of the interferences caused by the other multiple symbols is constant, if the interference weight corresponding to the non-zero symbol A1 or A2 is large (that is, the denominator in the equation (1) or (2) is larger), the calculated value of the non-zero symbol A1 or A2 will be small and therefore close to a value of a common data symbol. In this way, the transmitting side is not required to transmit signals with very high transmission power. On the contrary, if the value of the non-zero symbol A1 or A2 is large, the transmitting side has to increase the transmission power to transmit the non-zero symbol A1 or A2, even if the high transmission power is not necessary for transmissions of most common data symbols. The transmission power required for transmitting the non-zero symbol A1 or A2 may even exceed the maximum transmission power of the transmitting side. As can be seen, it is necessary to arrange the non-zero symbol at a position corresponding to a large interference weight, so as reduce the value of the non-zero symbol.

Figure 4:
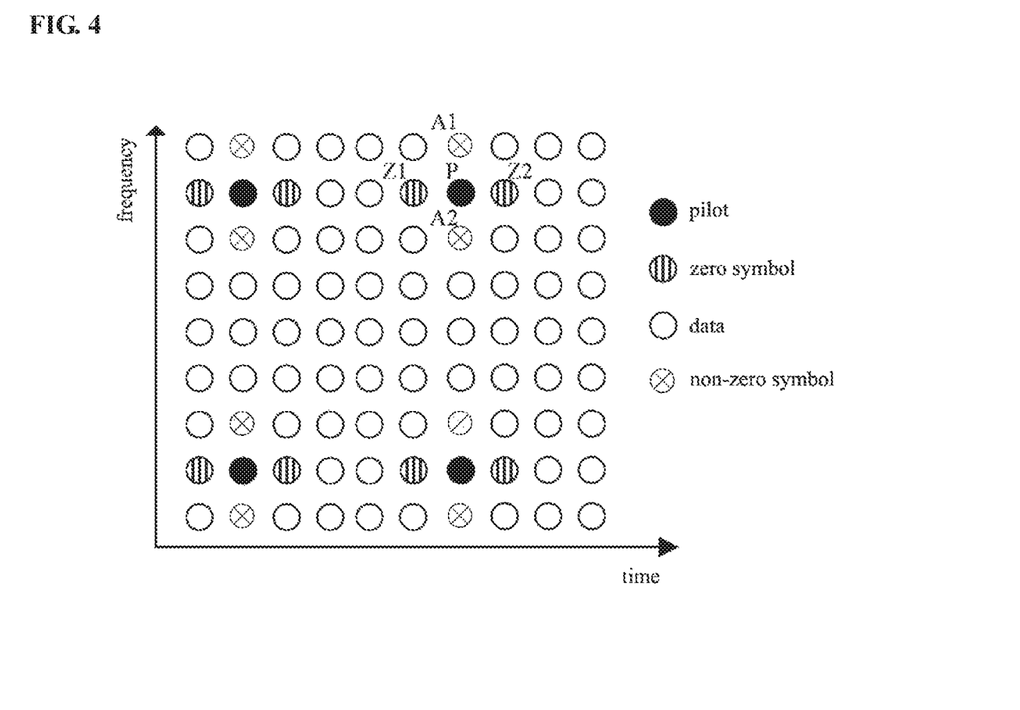
FIG. 4 schematically shows design for a pilot pattern according to another embodiment of the present disclosure.

FIG. 4 shows another example of a pilot pattern in the present disclosure. This example differs from the example shown in FIG. 3 in that the pilot pattern further includes zero symbols Z1 and Z2 arranged at two adjacent positions on the left and right of the pilot symbol P in time domain (in FIG. 4, reference signs Z1 and Z2 are shown only for the pilot symbol at the upper right). The inter-symbol interference can be suppressed by zeroing the two positions. Therefore, with the pilot pattern shown in FIG. 4, both the inter-carrier interference and the inter-symbol interference can be cancelled.

Figure 5:
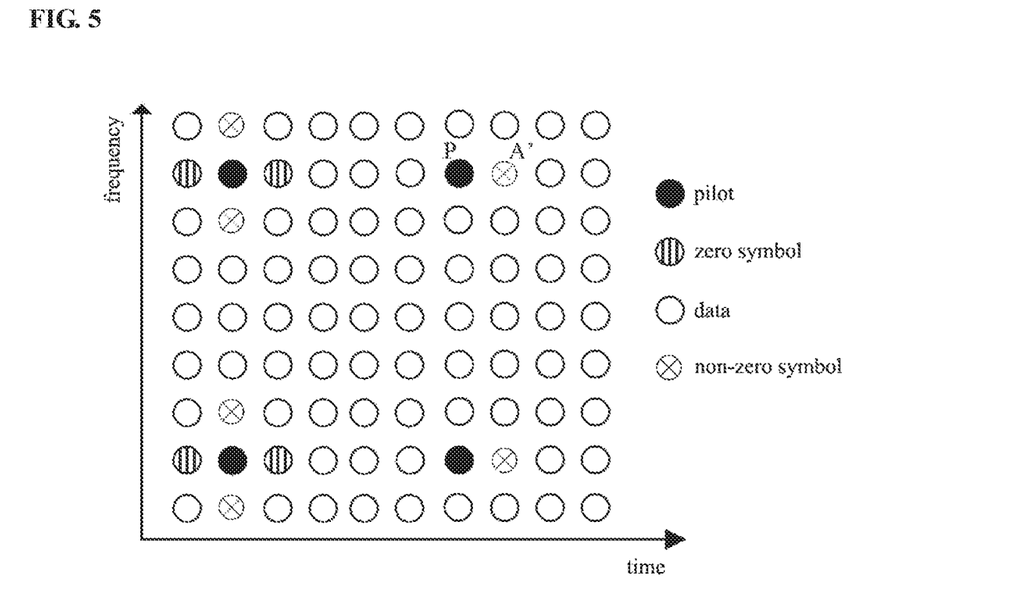
FIG. 5 schematically shows design for a pilot pattern according to another embodiment of the present disclosure.
Figure 6:
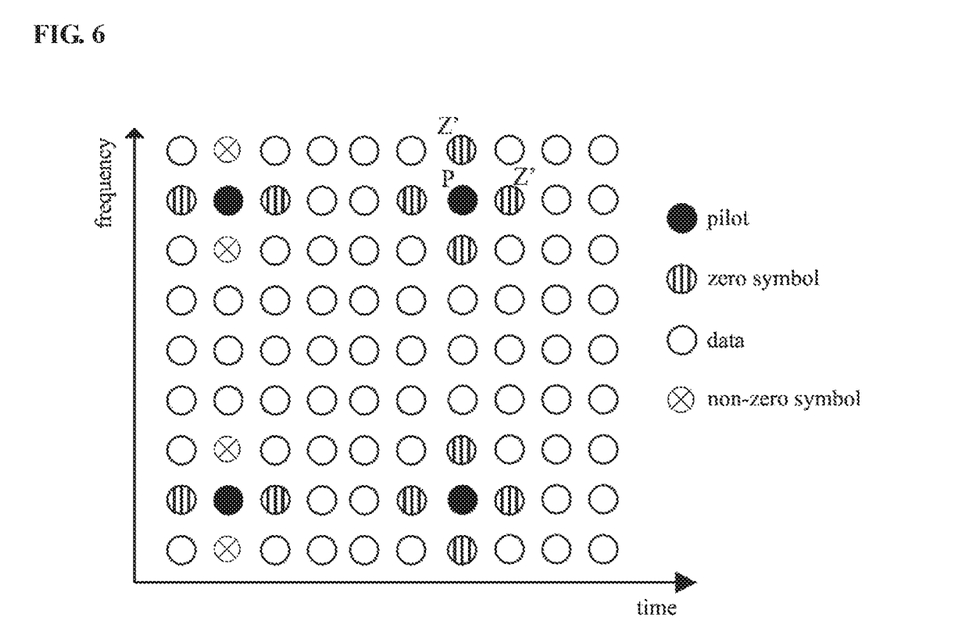
FIG. 6 schematically shows design for a pilot pattern according to another embodiment of the present disclosure.

In the embodiments shown in FIG. 3 and FIG. 4, the same pilot pattern is applied to multiple pilot symbols (four symbols shown in FIG. 3 and FIG. 4) inserted into the data. The present disclosure may be implemented by other modified embodiments in which other types of pilot patterns are applied to some of the multiple pilot symbols. FIG. 5 and FIG. 6 show another two modified embodiments.

In the embodiment shown in FIG. 5, the same pilot pattern as that shown in FIG. 4 is applied to two pilot symbols at the left part, and another type of pilot pattern is applied to two pilot symbols at the right part. As shown in FIG. 5, the pilot pattern at the right part includes a pilot symbol P and a non-zero symbol A' arranged at a position adjacent to the pilot symbol P in time domain. Similar to the non-zero symbols A1 and A2, the non-zero symbol A' is arranged to cancel the interference to the pilot symbol P caused by symbols around the pilot symbol P. However, the non-zero symbol A1 or A2 is merely used to cancel the inter-carrier interference to the pilot symbol P caused by multiple symbols on the corresponding sub-carrier, while the non-zero symbol A' is designed to cancel both the inter-carrier interference and the inter-symbol interference to the pilot symbol P caused by the symbols around the pilot symbol P. That is, a value of the non-zero symbol A' is calculated based on a sum of interferences caused by symbols within a certain range around the pilot symbol P (in both time domain and frequency domain).

It can be known that, in the method for calculating the value of the non-zero symbol described above, the interferences to the pilot symbol P caused by multiple symbols around the pilot symbol are canceled by only a single non-zero symbol, which results in a large value of the single non-zero symbol, and further requires large transmission power at the transmitting side. Nevertheless, spectrum resources can be saved by arranging a single auxiliary symbol, compared with a scheme of arranging multiple auxiliary symbols around the pilot symbol. The example shown in FIG. 5 gives teachings to combine the above two schemes. For example, in a case that the calculated value of the single non-zero symbol A' for a certain pilot symbol does not cause the transmission power to exceed the maximum transmission power of the transmitting side, only the single non-zero symbol A' may be arranged around the pilot symbol to cancel the interference. Otherwise the pilot pattern shown in FIG. 3 or FIG. 4 is applied to the pilot symbol.

In the modified embodiment shown in FIG. 6, the same pilot pattern as that shown in FIG. 4 is applied to two pilot symbols at the left part, and another type of pilot pattern is applied to two pilot symbols at the right part. In the pilot pattern at the right part, zero symbols are arranged at multiple positions (four positions shown in FIG. 6) directly adjacent to the pilot symbol P in frequency domain and time domain.

The solution of arranging the zero symbols at the four positions directly adjacent to the pilot symbol P has advantages of small amount of computation and simple implementation, but has drawbacks in range and accuracy of interference cancellation. Therefore, in a case that the range for the symbols causing inter-carrier interference is not large or the system has large tolerance to the channel estimation error, the simple pilot pattern shown at the right part of FIG. 6 may be adopted. Otherwise the pilot pattern shown in FIG. 3 or FIG. 4 is adopted.

It should be noted that both FIG. 5 and FIG. 6 show the arrangement in which another type of pilot pattern is applied to the pilot symbols at the right part, but the present disclosure is not limited thereto. In practice, any type of pilot pattern may be applied to any one of the multiple pilot symbols inserted into the data symbols.

Also, it should be noted that the multiple pilot symbols inserted into the data symbols may be arranged at equal or unequal spacing in time domain, and/or the multiple pilot symbols inserted into the data symbols may be arranged at equal or unequal spacing in frequency domain, which is not limited in the present disclosure. Those skilled in the art can easily make appropriate arrangements according to specific design requirement when understanding the principle of the present disclosure.

The design scheme for pilot pattern has been described above with reference to the various embodiments in the present disclosure, which may be implemented by software, hardware, or by a combination of software and hardware. As an example of the implementation by software, a program written in any suitable programming language and capable of implementing the present scheme may be stored in a storage medium. As an example of the implementation by hardware, the scheme may be implemented by a processor (for example, a CPU) capable of accessing a storage medium, or by other suitably programmed devices.

Figure 7:
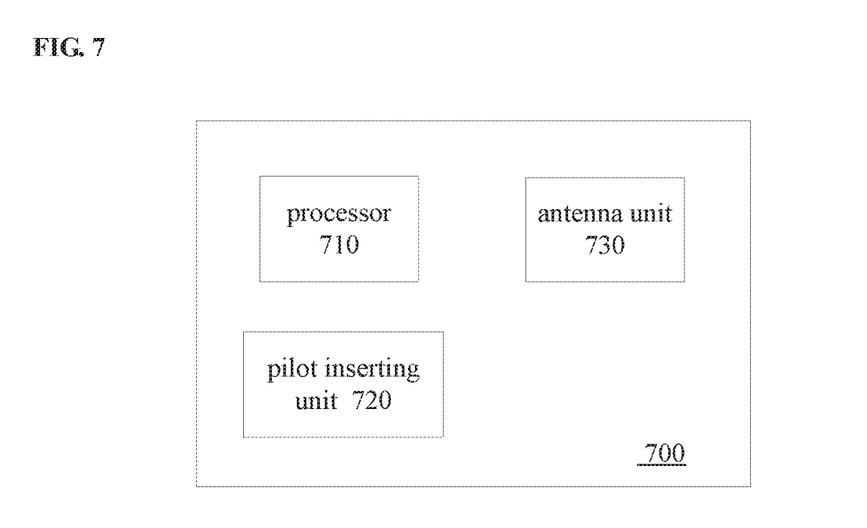
FIG. 7 is a schematic block diagram of a transmitting-side device in the present disclosure.
Figure 8:
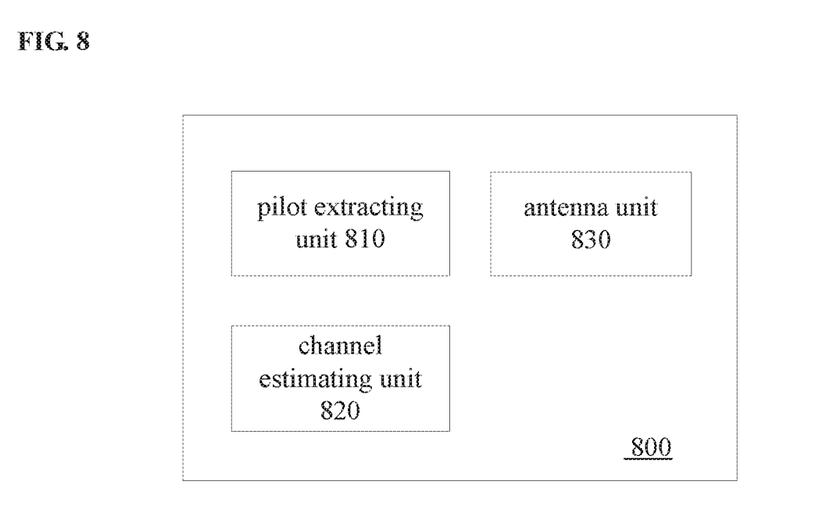
FIG. 8 is a schematic block diagram of a receiving-side device in the present disclosure.

Furthermore, there are provided a transmitting-side device capable of generating and inserting the above pilot pattern, and a receiving-side device capable of extracting the above pilot pattern and performing channel estimation in the present disclosure. FIG. 7 and FIG. 8 respectively are schematic block diagrams of a transmitting-side device and a receiving-side device.

As shown in FIG. 7, a transmitting-side device 700 includes a processor 710, a pilot inserting unit 720, and an antenna unit 730. The processor 710 is configured to generate an appropriate pilot pattern according to the solution described above, and provide the pilot pattern to the pilot inserting unit 720. The pilot inserting unit 720 is configured to insert the one or more generated pilot patterns into data symbols at appropriate positions. The data signals with the pilot patterns inserted therein are transmitted to the receiving side by the antenna unit 730.

As shown in FIG. 8, a receiving-side device 800 includes a pilot extracting unit 810, a channel estimating unit 820, and an antenna unit 830. The antenna unit 830 is configured to receive data signals with pilot patterns inserted therein from the transmitting side. The pilot extracting unit 810 is configured to extract a pilot symbol from the received data signals. Since the novel pilot pattern provided in the present disclosure is adopted in the transmitting-side device, the interference to the pilot symbol extracted by the pilot extracting unit 810 is greatly reduced. The channel estimating unit 820 is configured to perform channel estimation using the extracted pilot symbol. In this way, accuracy of the estimation result may be greatly increased.

Various devices or units described herein are merely logical in nature and do not strictly correspond to physical devices or entities. For example, the functionality of each unit described herein may be implemented by multiple physical entities or the functionality of multiple units described herein may be implemented by a single physical entity. In addition, it should be noted that features, components, elements, steps and the like described in an embodiment are not limited to the embodiment, but may also be applied to another embodiment, for example, by replacing specific features, components, elements, steps and the like in the other embodiment or combined with them.

Figure 9:
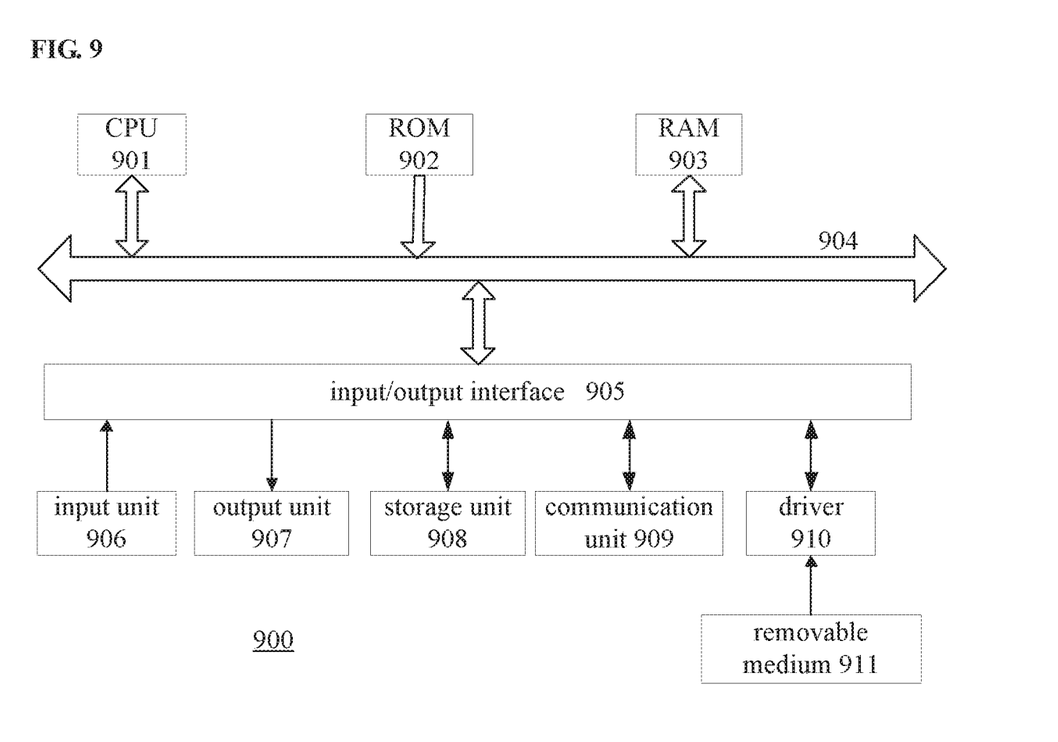
FIG. 9 is a block diagram showing an example configuration of computer hardware.

FIG. 9 is a block diagram showing an example configuration of computer hardware that executes the above-described processes based on a program.

In a computer 900, a central processing unit (CPU) 901, a read only memory (ROM) 902, and a random access memory (RAM) 903 are connected to each other via a bus 904.

An input/output interface 905 is further connected to the bus 904. The input/output interface 905 is connected with the following components: an input unit 906 implemented with keyboard, mouse, microphone and the like; an output unit 907 implemented with display, speaker and the like; a storage unit 908 implemented with hard disk, nonvolatile memory and the like; a communication unit 909 implemented with network interface card (such as local area network (LAN) card, modem); and a driver 910 that drives a removable medium 911 such as magnetic disk, optical disk, magneto-optical disk, or semiconductor memory.

In the computer having the above configuration, the CPU 901 loads a program stored in the storage unit 908 into the RAM 903 via the input/output interface 905 and the bus 904, and executes the program so as to execute the above processes.

A program to be executed by the computer (CPU 901) may be recorded on the removable medium 911 which is a package medium implemented with magnetic disk (including floppy disk), optical disk (including compact disk-read only memory (CD-ROM)), digital versatile disk (DVD), and the like), magneto-optical disk, or semiconductor memory, and the like. In addition, the program to be executed by the computer (CPU 901) may also be provided via wired or wireless transmission medium such as local area network, the Internet, or digital satellite broadcast.

In a case where the removable medium 911 is installed in the driver 910, the program may be installed in the storage unit 908 via the input/output interface 905. In addition, the program may be received by the communication unit 909 via wired or wireless transmission medium, and then the program may be installed in the storage unit 908. Alternatively, the program may be installed in the ROM 902 or the storage unit 908 in advance.

The program to be executed by the computer may be a program that executes the processes according to the order described in the present disclosure, or may be a program that executes the processes in parallel or executes the processes when needed (for example, when called).

The embodiments and the technical effects of the present disclosure have been described above in detail in conjunction with the drawings, but the scope of the present disclosure is not limited thereto. It should be understood by those skilled in the art that various modifications or changes can be made to the embodiments discussed herein without departing from the spirit and principle of the present disclosure, depending on design requirements and other factors. The scope of the present disclosure is defined by the appended claims or their equivalents.

In addition, the present disclosure may also be configured as follows.

An electronic device for a filter bank multi-carrier system, including a processing circuitry configured to: determine, for a specific pilot symbol of at least one pilot symbol to be inserted into a data sequence, a first sub-carrier and a second sub-carrier adjacent to a position of the specific pilot symbol in frequency domain; determine at least a first position and a second position on the first sub-carrier and the second sub-carrier, respectively; and determine a first symbol to be inserted into the first position and a second symbol to be inserted into the second position, such that the first symbol can cancel interference to the specific pilot symbol caused by data symbols at other positions than the first position within a predetermined range on the first sub-carrier, and such that the second symbol can cancel interference to the specific pilot symbol caused by data symbols at other positions than the second position within a predetermined range on the second sub-carrier.

The first position and the second position are in alignment with the position of the specific pilot symbol in time domain.

The processing circuitry is further configured to: determine, on a sub-carrier where the specific pilot symbol is located, two positions adjacent to the position of the specific pilot symbol in time domain, so as to zero the two positions.

The processing circuitry is further configured to: determine interference weights of the filter bank multi-carrier system; determine, using the interference weights, the interference to the specific pilot symbol caused by the data symbols at the other positions on the first sub-carrier, and the interference to the specific pilot symbol caused by the data symbols at the other positions on the second sub-carrier, and determine, using the interference weights and the determined interference, values of the first symbol and the second symbol.

An interference weight corresponding to the first position is greater than interference weights corresponding to the other positions on the first sub-carrier; and an interference weight corresponding to the second position is greater than interference weights corresponding to the other positions on the second sub-carrier.

The first symbol and the second symbol are non-zero symbols.

The processing circuitry is further configured to: determine the predetermined range on the first sub-carrier and the predetermined range on the second sub-carrier based on at least one of characteristic of the filter bank and error rate requirement.

The processing circuitry is further configured to: determine, for another pilot symbol located at a predetermined distance from the specific pilot symbol, a third position on a sub-carrier where the another pilot symbol is located, the third position being adjacent to a position of the another pilot symbol in time domain; and determine a third symbol to be inserted into the third position, such that the third symbol can cancel interference to the another pilot symbol caused by data symbols at other positions than the third position within a predetermined range around the another pilot symbol.

The processing circuitry is further configured to: determine, for another pilot symbol located at a predetermined distance from the specific pilot symbol, multiple positions directly adjacent to a position of the another pilot symbol in both frequency domain and time domain, so as to insert zero symbols in the multiple positions respectively.

The at least one pilot symbol is arranged at equal spacing in at least one of time domain and frequency domain.

The at least one pilot symbol is arranged at unequal spacing in at least one of time domain and frequency domain.

A method for setting pilot in a filter bank multi-carrier system, including: determining, for a specific pilot symbol of at least one pilot symbol to be inserted into a data sequence, a first sub-carrier and a second sub-carrier adjacent to a position of the specific pilot symbol in frequency domain; determining at least a first position and a second position on the first sub-carrier and the second sub-carrier, respectively; determining a first symbol and a second symbol, such that the first symbol can cancel interference to the specific pilot symbol caused by data symbols at other positions than the first position within a predetermined range on the first sub-carrier, and such that the second symbol can cancel interference to the specific pilot symbol caused by data symbols at other positions than the second position within a predetermined range on the second sub-carrier; and inserting the first symbol and the second symbol into the first position and the second position, respectively.

The first position and the second position are in alignment with the position of the specific pilot symbol in time domain.

The method further includes: determining, on a sub-carrier where the specific pilot symbol is located, two positions adjacent to the position of the specific pilot symbol in time domain; and zeroing the two positions.

The method further includes: determining interference weights of the filter bank multi-carrier system; determining, using the interference weights, the interference to the specific pilot symbol caused by the data symbols at the other positions on the first sub-carrier, and the interference to the specific pilot symbol caused by the data symbols at the other positions on the second sub-carrier; and determining, using the interference weights and the determined interference, values of the first symbol and the second symbol.

An interference weight corresponding to the first position is greater than interference weights corresponding to the other positions on the first sub-carrier; and an interference weight corresponding to the second position is greater than interference weights corresponding to the other positions on the second sub-carrier.

The method further includes: determining the predetermined range on the first sub-carrier and the predetermined range on the second sub-carrier based on at least one of characteristic of filter bank and error rate requirement.

The method further includes: determining, for another pilot symbol located at a predetermined distance from the specific pilot symbol, a third position on a sub-carrier where the another pilot symbol is located, the third position being adjacent to a position of the another pilot symbol in time domain; determining a third symbol such that the third symbol can cancel interference to the another pilot symbol caused by data symbols at other positions than the third position within a predetermined range around the another pilot symbol; and inserting the third symbol into the third position.

The method further includes: determining, for another pilot symbol located at a predetermined distance from the specific pilot symbol, multiple positions directly adjacent to a position of the another pilot symbol in both frequency domain and time domain; and inserting zero symbols in the multiple positions respectively.

The at least one pilot symbol is arranged at equal spacing in at least one of time domain and frequency domain.

The at least one pilot symbol is arranged at unequal spacing in at least one of time domain and frequency domain.

An information processing apparatus in a filter bank multi-carrier system, including: the electronic device described above; a pilot inserting device configured to insert a pilot pattern consisting of the specific pilot symbol, the first symbol and the second symbol into the data sequence; and one or more antennas configured to transmit the data sequence in which the pilot pattern is inserted.

In the pilot pattern, on the sub-carrier where the specific pilot symbol is located, two positions adjacent to the specific pilot symbol in time domain are zeroed respectively.

An information processing apparatus in a filter bank multi-carrier system, including: one or more antennas configured to receive a data sequence in which a pilot pattern is inserted, where the pilot pattern contains a pilot symbol; a pilot extracting device configured to extract the pilot symbol from the received data sequence; and a channel estimating device configured to perform channel estimation using the extracted pilot symbol. In the pilot pattern, a first symbol and a second symbol are respectively arranged on a first sub-carrier and a second sub-carrier adjacent to a position of the pilot symbol in frequency domain. The first symbol is used for canceling interference to the pilot symbol caused by data symbols other than the first symbol within a predetermined range on the first sub-carrier, and the second symbol is used for canceling interference to the pilot symbol caused by data symbols other than the second symbol within a predetermined range on the second sub-carrier.

A position of the first symbol is in alignment with the position of the pilot symbol in time domain, and a position of the second symbol is in alignment with the position of the pilot symbol in time domain.

In the pilot pattern, on the sub-carrier where the pilot symbol is located, two positions adjacent to the position of the pilot symbol in time domain are zeroed respectively.

The invention claimed is:

1. An electronic device for a filter bank multi-carrier system, comprising a processing circuitry configured to:
determine, for a specific pilot symbol of at least one pilot symbol to be inserted into a data sequence, a first sub-carrier and a second sub-carrier adjacent to a position of the specific pilot symbol in frequency domain;
determine at least a first position and a second position on the first sub-carrier and the second sub-carrier, respectively;
determine a predetermined range on the first sub-carrier and a predetermined range on the second sub-carrier based on at least one of characteristic of filter bank and error rate requirement; and determine a first symbol to be inserted into the first position and a second symbol to be inserted into the second position, such that the first symbol can cancel interference to the specific pilot symbol caused by data symbols at other positions than the first position within the predetermined range on the first sub-carrier, and such that the second symbol can cancel interference to the specific pilot symbol caused by data symbols at other positions than the second position within the predetermined range on the second sub-carrier.

2. The electronic device according to claim 1, wherein the first position and the second position are in alignment with the position of the specific pilot symbol in time domain.

3. The electronic device according to claim 1, the processing circuitry being further configured to:

determine, on a sub-carrier where the specific pilot symbol is located, two positions adjacent to the position of the specific pilot symbol in time domain, so as to zero the two positions.

4. The electronic device according to claim 1, the processing circuitry being further configured to:

determine interference weights of the filter hank multi-carrier system;

determine, using the interference weights, the interference to the specific pilot symbol caused by the data symbols at the other positions on the first sub-carrier, and the interference to the specific pilot symbol caused by the data symbols at the other positions on the second sub-carrier; and determine, using the interference weights and the determined interference, values of the first symbol and the second symbol.

5. The electronic device according to claim 4, wherein an interference weight corresponding to the first position is greater than interference weights corresponding to the other positions on the first sub-carrier; and wherein an interference weight corresponding to the second position is greater than interference weights corresponding to the other positions on the second sub-carrier.

6. The electronic device according to claim 1, the processing circuitry being further configured to:

determine, for another pilot symbol located at a predetermined distance from the specific pilot symbol, a third position on a sub-carrier where the another pilot symbol is located, the third position being adjacent to a position of the another pilot symbol in time domain; and determine a third symbol to he inserted into the third position, such that the third symbol can cancel interference to the another pilot symbol caused by data symbols at other positions than the third position within a predetermined range around the another pilot symbol.

7. The electronic device according to claim 1, the processing circuitry being further configured to:

determine, for another pilot symbol located at a predetermined distance from the specific pilot symbol, a plurality of positions directly adjacent to a position of the another pilot symbol in both frequency domain and time domain, so as to insert zero symbols in the plurality of positions respectively.

8. A method for setting pilot in a filter bank multi-carrier system, comprising:

determining, for a specific pilot symbol of at least one pilot symbol to be inserted into a data sequence, a first sub-carrier and a second sub-carrier adjacent to a position of the specific pilot symbol in frequency domain;

determining at least a first position and a second position on the first sub-carrier and the second sub-carrier, respectively;

determining a predetermined range on the first sub-carrier and a predetermined range on the second sub-carrier based on at least one of characteristic of filter bank and error rate requirement;

determining a first symbol and a second symbol, such that the first symbol can cancel interference to the specific pilot symbol caused by data symbols at other positions than the first position within the predetermined range on the first sub-carrier, and such that the second symbol can cancel interference to the specific pilot symbol caused by data symbols at other positions than the second position within the predetermined range on the second sub-carrier; and inserting the first symbol and the second symbol into the first position and the second position, respectively.

9. The method according to claim 8, wherein the first position and the second position are in alignment with the position of the specific pilot symbol in time domain.

10. The method according to claim 8, further comprising:

determining, on a sub-carrier where the specific pilot symbol is located, two positions adjacent to the position of the specific pilot symbol in time domain; and zeroing the two positions.

11. The method according to claim 8, further comprising:

determining interference weights of the filter bank multi-carrier system;

determining, using the interference weights, the interference to the specific pilot symbol caused by the data symbols at the other positions on the first sub-carrier, and the interference to the specific pilot symbol caused by the data symbols at the other positions on the second sub-carrier; and determining, using the interference weights and the determined interference, values of the first symbol and the second symbol.

12. The method according to claim 11, wherein an interference weight corresponding to the first position is greater than interference weights corresponding to the other positions on the first sub-carrier; and wherein an interference weight corresponding to the second position is greater than interference weights corresponding to the other positions on the second sub-carrier.

13. The method according to claim 8, further comprising:

determining, for another pilot symbol located at a predetermined distance from the specific pilot symbol, a third position on a sub-carrier where the another pilot symbol is located, the third position being adjacent to a position of the another pilot symbol in time domain;

determining a third symbol such that the third symbol can cancel interference to the another pilot symbol caused by data symbols at other positions than the third position within a predetermined range around the another pilot symbol; and inserting the third symbol into the third position.

14. The method according to claim 8, further comprising:

determining, for another pilot symbol located at a predetermined distance from the specific pilot symbol, a plurality of positions directly adjacent to a position of the another pilot symbol in both frequency domain and time domain; and inserting zero symbols in the plurality of positions respectively.

15. An information processing apparatus in a filter bank multi-carrier system, comprising:
the electronic device of claim 1;
a pilot inserting device configured to insert a pilot pattern consisting of the specific pilot symbol, the first symbol and the second symbol into the data sequence; and
one or more antennas configured to transmit the data sequence in which the pilot pattern is inserted,
wherein in the pilot pattern, on the sub-carrier where the specific pilot symbol is located, two positions adjacent to the specific pilot symbol in time domain are zeroed respectively.

16. An information processing apparatus in a filter bank multi-carrier system, comprising:
one or more antennas configured to receive a data sequence in which a pilot pattern is inserted, wherein the pilot pattern contains a pilot symbol;
a pilot extracting device configured to extract the pilot symbol from the received data sequence; and
a channel estimating device configured to perform channel estimation using the extracted pilot symbol,
wherein in the pilot pattern, a first symbol and a second symbol are respectively arranged on a first sub-carrier and a second sub-carrier adjacent to a position of the pilot symbol in frequency domain,
wherein the first symbol is used for canceling interference to the pilot symbol caused by data symbols other than the first symbol within a predetermined range on the first sub-carrier, and the second symbol is used for canceling interference to the pilot symbol caused by data symbols other than the second symbol within a predetermined range on the second sub-carrier,
wherein the predetermined range on the first sub-carrier and the predetermined range on the second sub-carrier are determined based on at least one of characteristic of filter bank and error rate requirement.

17. The information processing apparatus according to claim 16, wherein a position of the first symbol is in alignment with the position of the pilot symbol in time domain, and a position of the second symbol is in alignment with the position of the pilot symbol in time domain.

18. The information processing apparatus according to claim 16, wherein in the pilot pattern, on the sub-carrier where the pilot symbol is located, two positions adjacent to the position of the pilot symbol in time domain are zeroed respectively.

* * * * *